United States Patent [19]

Ritz et al.

[11] 3,984,444

[45] Oct. 5, 1976

[54] ISOMERIZATION PROCESS OF A HIGHER FATTY ACID ESTER HAVING ISOLATED DOUBLE BONDS

[75] Inventors: Jürgen Ritz, Mainz-Mombach; Johannes Reese, Wiesbaden-Biebrich, both of Germany

[73] Assignee: Hoechst Aktiengesellschaft, Frankfurt, Germany

[22] Filed: Dec. 4, 1974

[21] Appl. No.: 529,377

Related U.S. Application Data

[63] Continuation of Ser. No. 304,927, Nov. 9, 1972, abandoned.

[30] Foreign Application Priority Data

Nov. 10, 1971 Germany ........................... 2155727
Oct. 13, 1972 Germany ........................... 2250232

[52] U.S. Cl. ........................................ 260/405.6
[51] Int. Cl.[2] ........................ C09F 7/06; C11C 3/14
[58] Field of Search .............................. 260/405.6

[56] References Cited

UNITED STATES PATENTS 3,162,658 12/1964 Balter ............................ 260/405.6

FOREIGN PATENTS OR APPLICATIONS 1,156,789 4/1960 Germany ........................ 260/405.6

*Primary Examiner*—Winston A. Douglas
*Assistant Examiner*—John F. Niebling
*Attorney, Agent, or Firm*—Littlepage, Quaintance, Murphy & Dobyns

[57] ABSTRACT

A process for the isomerization of an ester of an alcohol having 1 to 12 carbon atoms and an fatty acid having 10 to 24 carbon atoms and isolated double bonds to the corresponding compound having conjugated double bonds which comprises isomerizing said ester at a temperature of 0° to 160°C in the presence of at least 0.8% by weight of an alkaline reacting metal alcoholate of a monohydric alcohol having 1 to 12 carbon atoms and a strongly polar aprotic solvent, the weight ratio of the solvent to said ester being at least 0.5:1 and the weight ratio of the alcoholate being calculated as potassium methylate and based on said ester and a coating composition containing as an essential ingredient a binder obtained according to said process.

8 Claims, No Drawings

ISOMERIZATION PROCESS OF A HIGHER FATTY ACID ESTER HAVING ISOLATED DOUBLE BONDS

This is a continuation of application Ser. No. 304,927, filed Nov. 9, 1972, now abandoned.

This invention is concerned with a process for the isomerisation of unsaturated compounds.

Naturally occurring oils contain a number of fatty acids having two or more double bonds. Oils containing relatively large proportions of such fatty acids are e.g. used by the lacquer and dye industries for the production of oxidatively drying alkyd resins where the capacity of the unsaturated fatty acids to react with atmospheric oxygen is utilized. In the case of an air-drying alkyd resin such oxidation leads to curing by cross-linking. Fatty acids containing conjugate double bonds are particularly reactive but such fatty acids are not abundant in nature. There are however a relatively large number of naturally occurring fatty acids which have two or more double bonds separated from one another by a methylene group.

Attempts have been made to isomerise the isolated double bonds of such fatty acids to yield compounds having conjugate double bonds. Thus isomerisation has been attempted, inter alia, with catalysts such as metal carbonyls, metallic nickel on charcoal or sulphur or tellurium which allow isomerisation to proceed via energetically favourable intermediates. If however these catalysts are adsorbed on charcoal as is the case with e.g. nickel or noble metal catalysts incomplete isomerisation is obtained even at relatively high temperatures e.g. in excess of 150°C. Additionally the highly reactive conjugate double bonds formed under such conditions may react further with the formation of undesirable side products by polymerisation or cyclisation.

It has also been proposed to isomerise fatty acid esters of monohydric alcohols in the presence of catalytic quantities of alkoxides at 60° to 180°C. Fatty acid esters of polyhydric alcohols and indeed the fats themselves do not however isomerise when subjected to this process. Furthermore commercially acceptable results are only obtained at temperatures above 100°C.

The present invention provides a process for the isomerisation of an ester of a fatty acid having isolated double bonds to the corresponding compound having conjugated double bonds which comprises isomerising said ester at a temperature of 0° to 160°C in the presence of at least 0.8% by weight of an alkaline reacting metal alcoholate of a monohydric alcohol and a strongly polar aprotic solvent, the weight ratio of the solvent to said ester being at least 0.5:1 and the weight ratio of the alcoholate being calculated as potassium methylate and based on said ester.

The process of the invention has the advantage that the isomerisation is performed under relatively careful conditions and undesirable side products such as may be formed by cyclisation or polymerisation are either not obtained at all or are only obtained in very small quantities. Under the conditions according to the invention the catalyst only brings about displacement of the double bonds and no transesterification occurs in the presence of a strongly polar aprotic solvent. It is thus possible to use only small quantities of the catalyst since transesterification of the fatty acid ester by means of the catalyst which would take place more quickly than the isomerisation does not occur.

Suitable aprotic solvents include dimethylsulphoxide, dimethylformamide, dimethylacetamide, ethyleneglycol diethylether, tetramethylurea, tetramethylenesulphone, N-methylpyrrolidone, hexamethylphosphoric acid triamide, cyclohexanone, isophorone, acetophenone and ethylenecarbonate.

Suitable alkoxides include those of alkali metal and/or alkaline earth metals e.g. sodium, calcium or magnesium, or zinc, preferably potassium with a monohydric alcohol having 1 to 12, advantageously up to 6 carbon atoms such as methanol, ethanol, propanols, butanols, pentanols, hexanols, octanols, nonanols. Two preferred alkoxides are potassium butylate and potassium methylate.

As the alkoxide anions are not solvated in the aprotic solvents they have much greater basicity than in conventional solvents so that catalytic activity for the isomerisation is considerably increased.

Fatty acid esters which may be isomerised are those of fatty acids with 10 to 24 C-atoms and mono- or polyhydric alcohols with 1 to 12 C-atoms, e.g. glyceride esters or mixtures thereof occurring in natural or synthetic oils. In particular there may be used natural animal and/or vegetable oils such as linseed oil, soya oil, sunflower seed oil, fish oil, hemp oil, lupin oil, maize oil, poppy seed oil, and safflower oil. Mixed esters may also be used. Suitable alcohol components for the fatty acid ester are straight chained or branched alcohols with primary, secondary or tertiary alcoholic OH groups such as those mentioned above relative to the alkoxides as well as glycerol, trimethylolethane or -propane, pentaerythritol, and diols such as ethanediol, propane-1,2 or 1,3 diol or the various butane diols, and 2,2-dimethylpropane diol.

The alkoxide is preferably used in quantities of from 1 to 5% by weight based on the fatty acid esters. Larger amounts of alkoxide e.g. 6% or more can also be used, but the main advantage of the invention resides in the possibility of being able to use small quantities of catalyst. The above proportions of catalyst are calculated for potassium methylate so that if an alkoxide of one of the above mentioned alcohols with a higher molecular weight is used the proportion must be increased correspondingly. Conversely when using a sodium or lithium alkoxide it may be necessary to reduce the catalyst proportion. Thus for example a minimum quantity of 2.5% by weight of sodium methylate based on the fatty acid esters of polyhydric alcohols can suffice. If the isomerisation is of fatty acid esters of monohydric alcohols then generally very small quantities of catalyst suffice.

The fatty acid ester e.g. oil reacted according to the invention can be dyed after isomerisation but the colour disappears almost completely after distilling off the solvent used and washing the product with dilute acid and water.

The isomerisation is preferably effected under an inert gas atmosphere. Thus carbon dioxide must not be used because it reacts with alkoxides to form carbonates and alcohols.

The mixing ratio of solvent to fatty acid ester is generally not more than 10:1. preferably 5:1 and may be as low as 0.8:1.

The isomerisation of fatty acid esters of polyhydric alcohols is preferably performed at less than 60°C, advantageously less than 50°C, in order to obtain at least 90% isomerisation. It is not generally advantageous to work below 10°C, and the isomerisation is advantageously performed at temperatures of up to 35°C. The isomerisation of fatty acid esters of monohydric alcohols takes place in good yield over the entire temperature range 0° to 160°C. Generally the reaction is continued for 2 to 20, advantageously 2 to 8 hours shorter times being required for relatively high temperatures and longer times for relatively low temperatures.

It is not necessary for the reaction components to be present in the solvent as a clear solution. It is also possible to select the proportions of the reaction components and solvent in such a way that they are outside the limits of mutual miscibility. Nevertheless even in such cases the reaction is performed smoothly and a good yield is obtained.

The products obtained by the process according to the invention have the advantageous characteristics that they are relatively pure and their content of conjugate double bonds is high. They are particularly suitable for the preparation of binders for use in air drying paints, coatings, linings, laminates, paper size, jointing substances, cast and moulded articles as well as impregnating agents, particularly for fibrous materials, sizing agents and as an ingredient for hair sprays.

It is also possible to use them as starting substances for further reactions such as Diels-Alder-syntheses and for the addition of maleic acid derivatives and vinyl monomers or for other reactions of conjugate double bonds. Other reactions include cyclisation or oxidation of the conjugate double bonds e.g. in air with film formation.

The following examples illustrate the invention. In all examples the yield is 100%.

EXAMPLE 1

500 g of soya fatty acid methyl ester are dissolved in 500 g of dimethylsulphoxide and mixed with 5 g of pulverulent potassium methylate. The mixture is heated to 50°C with stirring for 3 hours under a nitrogen atmosphere. After distilling off the solvent and washing the products with dilute hydrochloric acid (0.01 N) and water a product is obtained with a proportion of conjugate double bonds of 97% (based on the available conjugatable double bonds). This percentage was determined by UV-spectroscopy (cf. B. Sreenivasan and J. B. Brown in the "Journal of American Oil Chemists' Society", vol 33 (1956), page 521; and vol 35 (1958) page 89).

EXAMPLE 2

500 g of soya fatty acid methyl ester are dissolved in 500 g of dimethylformamide and mixed with 5 g of pulverulent potassium methylate. The mixture was stirred at room temperature (20°C) for 14 hours under nitrogen. After working up according to Example 1 a product is obtained with a proportion of conjugate double bonds of 94%.

EXAMPLE 3

1000 g of soya oil are mixed with a solution of 30 g of pulverulent potassium methylate in 1000 g of dimethylformamide and stirred at room temperature (20°C) for 24 hours under nitrogen. After working up according to Example 1 a product with a conjugation level of 98% is obtained. The same conjugation level is obtained if linseed oil is isomerised instead of soya oil. If potassium methylate is replaced by an equivalent amount of sodium methylate a conjugation level of 94% is obtained.

EXAMPLE 4

1000 g of soya oil are stirred with a solution of 45 g of pulverulent potassium tert.-butylate in 1000 g of hexamethylphosphoric acid triamide under nitrogen for 24 hours at room temperature (20°C). After working up according to Example 1 the product has a conjugation level of 95%.

EXAMPLE 5

1000 g of linseed oil are stirred with a solution of 40 g of potassium tert.-butylate in 1000 g of dimethylformamide under nitrogen for 24 hours at room temperature (20°C). After working up according to Example 1 a product with a conjugation level of 97% is obtained. If the linseed oil is replaced by the same amount of sunflower seed oil a conjugation level of 96% is obtained.

EXAMPLE 6

500 g of soya oil are stirred with a solution of 20 g of pulverulent potassium tert. butylate in 500 g of dimethylformamide under nitrogen at 100°C. A sample taken after an hour has, after working up according to Example 1, a conjugation level of 58% which did not change on further processing.

EXAMPLE 7

500 g of soya oil are stirred with a solution of 15 g of pulverulant potassium methylate in 500 g of hexamethyl phosphoric acid triamide under nitrogen at 100°C. A sample taken after 1 hour has, after processing according to Example 1, a conjugation level of 55%, which does not change on further processing.

EXAMPLE 8

500 g of soya oil are stirred with a solution of 15 g of powdered potassium methylate in 500 g of dimethylformamide under nitrogen at 150°C. After 1 hour a product is obtained which, after working up according to Example 1, has a conjugation level of 52%.

EXAMPLE 9

500 g of soya fatty acid methylester are dissolved in 500 g of hexamethylphosphoric acid triamide and mixed with 5 g of powdered potassium methylate. The mixture is heated to 155°C under nitrogen for 1 hour and stirred. After working up the product according to Example 1 it has a conjugation level of 97%.

EXAMPLE 10

500 g of sunflower seed oil are dissolved in 500 g of N-methylpyrrolidone and mixed with 20 g of pulverulent potassium tert.-butylate. After stirring for 24 hours at room temperature under nitrogen and further working up according to Example 1 the product has a conjugation level of 93%.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the isomerisation of an ester of a polyhydric alcohol having 2 to 12 carbon atoms and a fatty acid having 10 to 24 carbon atoms and isolated double bonds to the corresponding compound having conjugated double bonds which comprises isomerising said ester of a polyhydric alcohol having 2 to 12 carbon atoms at a temperature of 0° up to 60°C in the presence of at least 0.8% by weight of an alkaline reacting metal alcoholate of a monohydric alcohol having 1 to 12 carbon atoms and a strongly polar aprotic solvent, the weight ratio of the solvent to said ester being 0.5:1 to 10:1 and the weight ratio of the alcoholate being calculated as potassium methylate and based on said ester, until at least 90% of said isolated double bonds are isomerized to conjugated double bonds.

2. A process as claimed in claim 1 wherein the isomerisation is effected under a gas which is inert to the components of the reaction mixture under the conditions of of isomerisation.

3. A process as claimed in claim 1 wherein the weight ratio of the solvent to the fatty acid esters exceeds the mutual miscibility.

4. A process for the isomerisation of an ester comprising the step of maintaining a fatty acid ester of:

A. a fatty acid having 10 to 24 carbon atoms and having isolated double bonds and B. a polyhydric alcohol having 2 to 12 carbon atoms in the presence of C. at least 0.8% by weight an alcoholate catalyst of a metal selected from the group consisting of alkali metal, alkaline earth metal, zinc, and combinations thereof, and of a monohydric alcohol having 1 to 12 carbon atoms, and D. a strongly polar aprotic solvent selected from the group consisting of dimethylformamide, dimethylacetamide, ethyleneglycol diethylether, tetramethylurea, tetramethylenesulphone, N-methylpyrrolidone, hexamethylphosphroic acid triamide, cyclohexanone, isophorone, acetophenone and ethylenecarbonate, at a temperature in the range of 0°C up to 60°C;

the weight ratio of said solvent to said ester being at least 0.5:1 and the weight ratio of said alcoholate being calculated as potassium methylate and being based on the weight of said ester, until at least 90% of said isolated double bonds are isomerized to conjugate double bonds.

5. The process of claim 2 wherein the weight ratio of aprotic solvent to the ester is 0.8:1 to 10:1.

6. The process of claim 2 in which the isomerisation is carried out in the presence of a gaseous atmosphere which is inert to the components of the reaction mixture under the reaction conditions.

7. A process for the isomerization of a fatty acid ester comprising the step of maintaining between 0° and 60° C a fatty acid ester of A. a fatty acid having 10 to 24 carbon atoms and having isolated double bonds and B. a polyhydric alcohol having 2 to 12 carbon atoms in the presence of C. at least 0.8% by weight of an alcoholate of a metal zinc selected from the group consisting of an alkali metal, an alkaline earth metal and combinations thereof, and of a monohydric alcohol having 1 to 12 carbon atoms, said alcoholate being calculated as potassium methylate and being based on the weight of said ester, and D. a strongly polor aprotic solvent in an amount equaling 0.5 to 10 times the weight of said ester, E. until at least 90% of said isolated double bonds are isomerised to conjugated double bonds.

8. The process of claim 1 wherein the temperature is 0° to 50°C.

* * * * *